(No Model.)
G. M. CLARK.
CULTIVATOR.
No. 330,960. Patented Nov. 24, 1885.
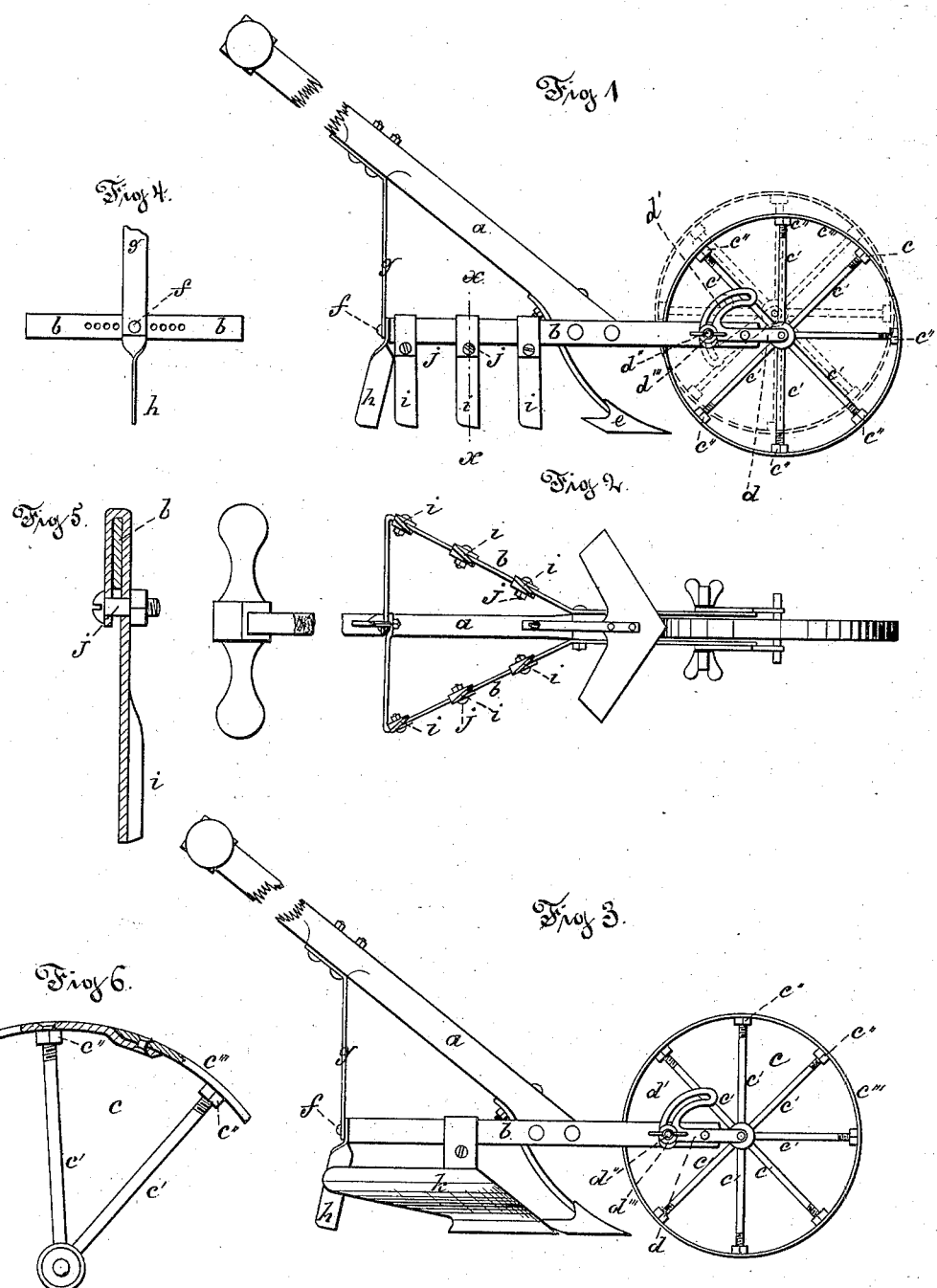

UNITED STATES PATENT OFFICE.

GEORGE M. CLARK, OF HIGGANUM, CONNECTICUT.

CULTIVATOR.

SPECIFICATION forming part of Letters Patent No. 330,960, dated November 24, 1885.

Application filed February 15, 1883. Serial No. 85,211. (No model.)

*To all whom it may concern:*

Be it known that I, GEORGE M. CLARK, of Higganum, in the county of Middlesex and State of Connecticut, have invented a certain new and useful Improvement in Cultivators, whereof the following is a description, reference being had to the accompanying drawings, where—

Figure 1 is a side view. Fig. 2 is a bottom view. Fig. 3 is a side view of a modification. Fig. 4 is a rear view in detail, intended to assist in showing how the guide-blade is attached to the frame. Fig. 5 is a detail view, enlarged, in vertical section on the line $x\ x$. Fig. 6 is a view of a portion of the wheel, with a part of that wheel shown in section.

The present improvements relate to a machine for stirring, agitating, and cultivating the soil.

The letter $a$ denotes the handle of the machine. To it is attached the frame, made of elastic metallic material in two strips, $b\ b$, attached to the sides of the handle by bolts or the like, extending forward of the handle, and there forming a support for the wheel $c$, and also extending rearward of the handle, and there forming a support for blades thereto attached, for the purpose of stirring, agitating, and cultivating the soil. The wheel referred to is made in a peculiar manner. From its hub project metallic spokes $c'$, which are threaded at the end and bear the nuts $c''$. The ends of these spokes run through the metallic rim $c'''$ and are headed down, so as to prevent the rim from escaping. The nuts enable the rim to be properly expanded and brought to a proper seat and tension before the spokes are cut off outside the rim and headed down. This wheel is vertically adjustable upon the frame to which it is hung, for the purpose of regulating the depth to which the blades shall penetrate the soil. This is effected by hanging the wheel in the levers $d$, which are pivoted to the frame, and are provided with the quadrant-slots $d'$, which play upon studs $d''$, projecting from the frame, which studs are furnished with the thumb-nuts $d'''$, whereby the wheel may be secured at any desired adjustment.

The letter $e$ denotes a share-blade permanently attached to the structure, the immediate means of the attachment being the base of the handle. The frame $b\ b$ is triangular in its general shape, and the two rails which constitute the same are adjustable toward and from each other, or laterally expansible and contractible, not by means of hinges or joints, but by means of the elasticity inherent in the frame, spring-steel being used by preference for their construction. The rear ends of these rails, which constitute the frame, meet and overlap, and are there provided with a series of holes, (best seen in Fig. 4,) through which runs a short bolt, $f$, provided with a nut, whereby the frame may be held at the desired adjustment. This frame is peculiarly braced by the brace $g$, which starts from the handle and runs down to the place where the rear ends of the rails of the frame meet and overlap, and this brace is secured to the frame by the same bolt, $f$, which holds the frame in adjustment.

The letter $h$ denotes a guide-blade secured to the frame by this same nut $f$ between the frame and the brace $g$. This blade enters the soil and acts as a guide or rudder to hold the machine steady in its course. On the frame are hung stirrer-blades $i$, for entering and stirring the soil. They are twisted so as to set at an angle to that part or rail of the frame to which they are attached, and this peculiar shape of the blade gives it increased efficacy in its function of stirring the soil. The blades which are hung upon the frame are adjustably hung—that is, they may be set back and forth longitudinally—so as to mass them together or spread them apart, and they have a somewhat peculiar mode of adjustment. They are provided with a hook at the top, which takes over and fits to the rail of the frame, as is shown best in Fig. 5, and they are secured in place, when adjusted, by a bolt and nut, $j$.

In Fig. 3 the stirrer-blades are shown as removed, and the small plow-blade $k$ is shown attached to the frame in the same manner as the stirrer-blades are attached.

I claim as my improvement—

1. In combination, the frame, the handle, the wheel forward of the handle, and the guide-blade directly in the rear of the handle, substantially as described, and for the purpose set forth.

2. In combination, the handle, the frame, the wheel forward of the handle, the share-blade back of the wheel, the guide-blade back of the share-blade, and the soil-stirring blades, all substantially as described, and for the purpose set forth.

GEORGE M. CLARK.

Witnesses:
 H. H. BRAINARD,
 L. S. GAY.